June 14, 1927.  1,632,539

R. CHILTON

LOAD LIMITING CLUTCH

Filed May 5, 1926   2 Sheets-Sheet 1

INVENTOR
ROLAND CHILTON
BY
ATTORNEY

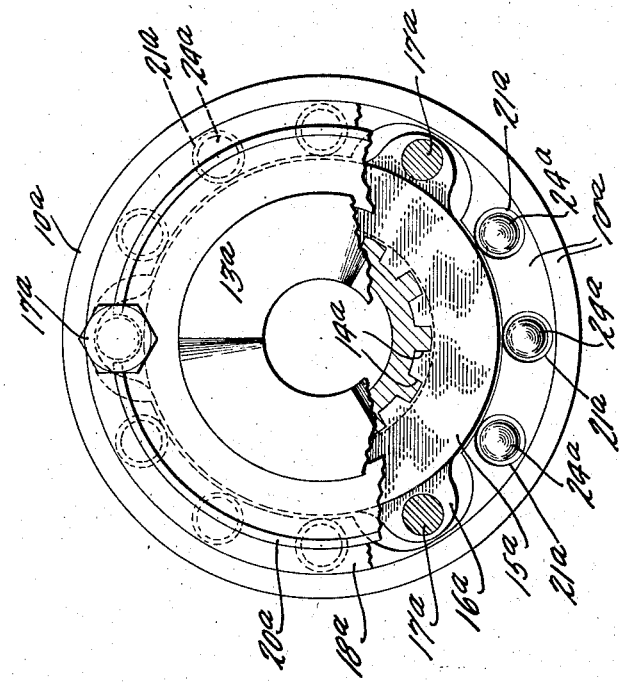
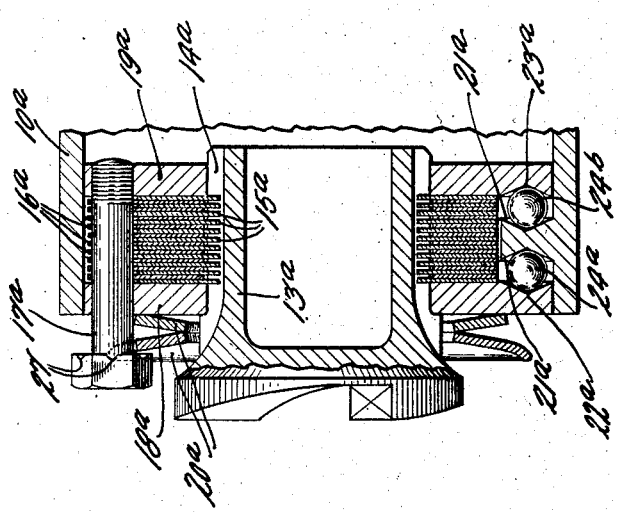

Patented June 14, 1927.

1,632,539

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

LOAD-LIMITING CLUTCH.

Application filed May 5, 1926. Serial No. 106,905.

This invention relates to load-limiting friction clutches having means whereby the driving load reacts in opposition to a preset friction pressure spring to release the clutch at a preset load, in spite of wide variations in the condition of the friction surfaces. In such clutches, a driving and driven member are inter-connected for slight relative movement as the load overcomes the spring, and one of the principal objects of this invention is to provide simple and frictionless means for this purpose.

Due to the natural deflection of the parts under varying loads, appreciable movement of the interconnecting means occurs in clutches of this type, and one of the objects of this invention is to avoid all sliding contact and other frictional restraint to such movement, and especially to avoid all movement between the friction surfaces themselves, until the releasing load is reached. Such movement must occur in devices of the prior art before the friction pressure is reduced in response to an increased driving load as is illustrated by the elastic stretch of a band clutch member relative to an engaged drum and the relative rotation necessary to produce axial pressure changes between clutch members having screw thread interconnections. Such constructions are apt to be insensitive except to load increments sufficiently great to initiate sliding at the friction surfaces.

Another object of the invention is to provide a frictionless means whereby the friction producing the drive transmitting pressures are imposed upon a common spring means without imposing bearing loads between actuated parts subject to relative motion.

Other objects are to obtain relatively great capacity in a compact mechanism having the friction pressures evenly distributed over a large area and to provide a simple and rugged construction adapted to withstand high loads with a minimum of deflection and to provide a light structure, especially with regard to the flywheel effect of the driven elements.

Another object of the invention is to provide a reversible load-limiting clutch that will be equally effective for either direction of rotation without change in adjustment or disposition and wherein the driving and driven members may interchange functions.

It will be seen that, at the slipping load, part of the spring pressure is balancing the load reaction and part applying the friction pressure appropriated to slippage at that load, and that the latter pressure component will vary with the friction condition of the surfaces. For accuracy in maintaining a preset slipping point in spite of variations in friction, it is desirable that the variable or friction producing component of the spring pressure should be a small proportion of the drive reaction component, or in other words, that the organization be such that the preset load from the spring shall (when at rest) impose a friction pressure greatly in excess of that at which slippage is to occur. In the specific showing this is accomplished by using a heavy spring capable of supporting a multiplied reaction from the driving load, and a frictionless and balanced means for imposing such multiple reaction, comprise one of the features of this invention, which may alternatively be used to apply a multiplied friction producing pressure from a light spring subject to smaller reactions from the load. Multiplied friction effect from the spring pressure is obtained in the showing by the well known multiple-disc construction of the clutch.

Various other objects and advantages of the invention will be in part obvious from an inspection of the accompanying drawings and a careful consideration of the following particular description and claims embodying my invention.

In the drawings:—

Figure 3 is a vertical section of the preferred form of the invention.

Figure 4 is an end view of Fig. 3 as looking from the left hand side and has portions broken away for the sake of clearness.

Figure 2:
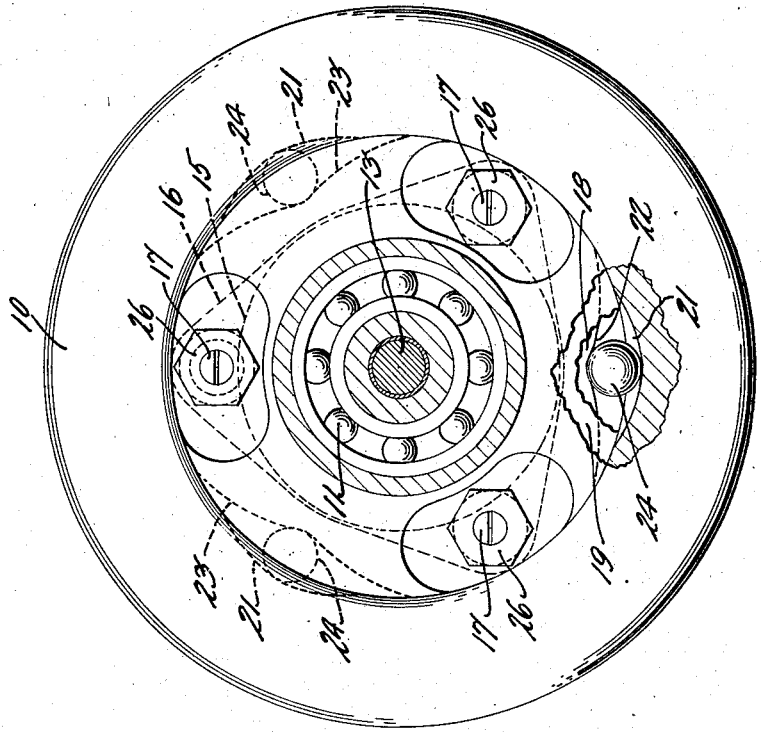
Figure 2 is a cross sectional view taken on the line 2 of Fig. 1 as looking in the direction indicated by the arrow.
Figure 1:
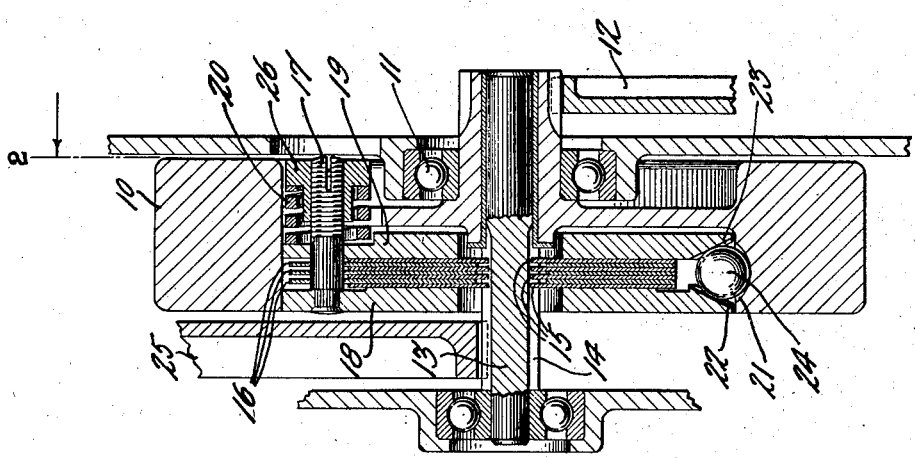
Figure 1 is a vertical section of one form of the invention.

In the present instance and with reference to Figs. 1 and 2 in particular, 10 designates the driving member for the clutch which is rotatably supported in a bearing 11 and drivably connected to a driving member 12.

The driven member 13 of the clutch is supported in the clutch driving member 10 in a manner as to permit of relative rotation between these members and has a plurality of splines 14.

Drivably engaged with the splines 14 are a multiplicity of friction disks 15 and alternating therewith are a number of similar disks 16 not engaged with the splines 14 but having connection with the bolts 17.

The friction disks 15, 16 are held between a pair of relatively heavy end plates 18, 19 which normally impose frictional driving pressure due to the action of a plurality of springs 20 which tend to draw these plates together.

The springs 20 are settable by the adjusting nuts 26 and provide the means by which the disks 15, 16 are held in frictional driving engagement up to any predetermined or desired amount of driving torque as will be more fully described hereinafter.

Upon the inner circumference of the clutch driving member 10 there is formed in equally spaced relation a plurality of pockets 21 having symmetrically sloping sides, and somewhat similar pockets 22, 23 are formed on the inner sides of each of the end plates 18, 19. The relative depth of the pockets 21, 22 and 23 should be such as to permit a ball 24 being retained therein without offering any restraint to the friction producing pressure of the end plates 18, 19 upon the disks 15, 16, when the clutch is free from driving load. The end plates 18, 19 are mounted so as to permit them to have a certain limited rotational movement within the clutch member 10.

In operation of the clutch under a normal load, the disks 15, 16 are held in frictional engagement with one another by the pressure of the springs 20. The balls 24 transmit motion from the clutch driving member 10 to the end plates 18, 19 by means of the recesses or inclined pockets 21, 22, 23, and to the disks 16 by means of the bolts 17. The disks 16 transmit the drive in turn to the disks 15 which are splined to the driven clutch member 13, said member 13 being drivably connected to a means to be driven such as a gear 25.

As a load is encountered which is in excess of the spring setting, the balls 24 will force the end plates 18, 19 apart due to the combined action of the balls against the sloping sides of the pockets 21, 22, 23 and relieve the friction producing pressure on the disks 15, 16, thus permitting relative motion therebetween. As the overload is relieved the balls will again move to the bottom of the pockets and permit the end plates to bear fully against the friction disks.

With reference to the preferred form shown in Figs. 3 and 4, 10$^a$ designates the clutch driving member, 13$^a$ the driven clutch member. To the member 13$^a$ there are connected by means of the splines 14$^a$ a plurality of friction disks 15$^a$, and rotatably mounted on this member are the end plates 18$^a$ and 19$^a$ which are adapted to move relatively to the clutch member 10$^a$.

The end plates in this instance are drawn together by the bolts 17$^a$ and springs 20$^a$ said springs being preferably of a dished type as shown in Fig. 3, the same being settable by the turning of the bolts 17$^a$. The underside of the bolt heads may be notched as at 27 and the outer spring so formed as to provide a portion that will engage with said notches so as to retain the bolts in any set position. The disks 16$^a$ alternate with the disks 15$^a$ and are connected to the bolts 17$^a$.

In this particular form of clutch two adjacently disposed rows of balls 24$^a$ and 24$^b$ are employed which are retained in conically formed pockets 22$^a$ and 23$^a$ but the mode of operating remains substantially the same as in the form first described. This preferred form is especially adapted for large driving capacity because the loads are distributed over a large number of discs and balls, whilst the conical form of ball pocket is adapted to easy manufacture.

Having thus described my invention, I claim,—

1. In apparatus of the class described the combination of, a plurality of driving and driven friction clutch members, a spring adapted to normally press said members into frictional driving contact, opposed inclined faces on a pair of said driving friction members, a driving member having inclined faces, and rolling means constituting driving means from the driving member to the driving clutch members and adapted to exert a separating tendency therebetween.

2. In apparatus of the class described the combination of a pair of axially separable members, clutch disks therebetween, a spring adapted to maintain said disks in frictional driving contact, anti-friction means adapted to transmit drive directly to each of said members and to impose a separating force therebetween proportional to the driving load and tending to release said frictional driving contact.

3. In a frictional clutch having a drive member, the combination of a pair of pressure members, friction clutch members therebetween, a preset spring adapted to axially press all of said members together, anti-friction driving means between each pressure member and the drive member adapted to impose a separating reaction between said pressure members.

4. In a clutch, an axially floating assemblage of clutch elements having end members, spring means adapted to impose equal and opposite friction contact pressures on the end members of said assemblage, and anti-friction driving means engaging each end member and adapted to impose equal and opposite separating pressure therebetween.

5. A friction clutch comprising in combination, an axially floating assemblage of clutch members including end members having opposed inclined driving surfaces, a spring adapted to press the members together, a driving member having inclined surfaces, and anti-friction driving means having rolling contact with said surfaces and tending to separate the clutch members when driving load is applied.

6. In apparatus of the class described, the combination of a clutch assemblage including a pair of end members having inclined depressions, a spring adapted to impose balanced pressures upon said end members, a driving member having inclined depressions, and rolling contact means in said depressions comprising the driving connection to said clutch assemblage and adapted to impose separating reactions therein.

7. In a load limiting device, the combination of, a pair of friction pressure plates, friction means therebetween, a spring means preset to normally impose a much greater pressure than appropriate to the desired slipping load, and anti-friction drive means between the plates adapted to impose a relatively great reaction on each plate from the drive in opposition to the spring pressure.

8. In a load limiting device, the combination of, a driven member, a pair of end pressure plates, a plurality of clutch plates therebetween drivably connected for relative axial movement alternately to the driven member and the end plates, a spring means for imposing axial contacting pressure on the plates, a driving member adapted for limited rotation relative to the end plates, opposed inclined faces on the end plates and the driving member, and rolling contact drive means therebetween adapted to impose axial separation reactions between the end plates.

9. In a clutch, the combination of, a driven member, a pair of end pressure plates, co-acting friction drive disks alternately drivably connected to the driven member and to the end plates respectively, anti-friction driving means engaging each of said plates and adapted to impose separating reactions therebetween, and a pressure spring preset to resist said reaction until an overload occurs.

10. In apparatus of the class described, the combination of, a driving means, a pair of axially separable driving clutch members, driven means frictionally engaged thereby, a spring normally effecting said engagement, and anti-friction means drivably connecting each clutch member to the driving means and adapted to relieve said frictional engagement.

11. In apparatus of the class described, the combination of, a driving member, a driven member, friction disks connected for rotation with the driven member, further friction disks connected for rotation with the driving member and alternating with the first said disks, a settable spring means, plates so disposed and normally actuated by said spring means as to compress said friction disks for unitary rotation, and spherical drive members engaging with the plates to impose a separating reaction thereon in opposition to said spring means.

Signed at Keyport, in the county of Monmouth, and State of New Jersey, this 3rd day of May, A. D. 1926.

ROLAND CHILTON.